(12) United States Patent
Gomez

(10) Patent No.: US 10,823,137 B2
(45) Date of Patent: Nov. 3, 2020

(54) METHODS AND SYSTEMS FOR DISASSEMBLING A PITCH BEARING FROM A WIND TURBINE HUB

(71) Applicant: General Electric Renovables Espana S. L., Barcelona (ES)

(72) Inventor: Daniel Gomez, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 101 days.

(21) Appl. No.: 16/106,726

(22) Filed: Aug. 21, 2018

(65) Prior Publication Data

US 2019/0063400 A1 Feb. 28, 2019

(30) Foreign Application Priority Data

Aug. 31, 2017 (EP) .................................. 17382592

(51) Int. Cl.
*F03D 80/70* (2016.01)
*F03D 1/06* (2006.01)
(Continued)

(52) U.S. Cl.
CPC ............ *F03D 1/065* (2013.01); *B23P 19/069* (2013.01); *F03D 1/0658* (2013.01); *F03D 7/0224* (2013.01); *F03D 80/50* (2016.05); *F03D 80/70* (2016.05); *B23P 6/00* (2013.01); *F05B 2230/60* (2013.01); *F05B 2230/70* (2013.01);
(Continued)

(58) Field of Classification Search
CPC ........ F03D 1/065; F03D 80/50; F03D 1/0658; F03D 7/0224; F03D 80/70; B23P 19/069; B23P 6/00; F05B 2260/301; F05B 2230/60; F05B 2240/50; F05B 2230/70; F16C 2360/31

See application file for complete search history.

(56) References Cited

U.S. PATENT DOCUMENTS

2006/0147308 A1 7/2006 Wobben
2011/0142617 A1* 6/2011 Mashue ................ F16C 33/581
                                                          415/229
(Continued)

FOREIGN PATENT DOCUMENTS

EP    2 675 593 B1    7/2015
EP    3 163 071 A1    5/2017

OTHER PUBLICATIONS

EP Search Report, dated Mar. 12, 2018.

*Primary Examiner* — Ryan J. Walters
(74) *Attorney, Agent, or Firm* — Dority & Manning, P.A.

(57) ABSTRACT

In a first aspect, a method of lowering a wind turbine blade assembly comprising a wind turbine blade and a pitch bearing from a wind turbine hub is provided. The method of lowering a wind turbine blade assembly comprises positioning the wind turbine blade in a substantially horizontal position, holding the wind turbine blade in the substantially horizontal position with a crane, removing the blade assembly from the hub and lowering the blade assembly with the crane. In a further aspect, a method of disassembling a pitch bearing from a wind turbine hub using a tool having a socket wrench is provided. In yet a further aspect, tool for connecting or disconnecting a wind turbine blade assembly to or from a hub of a wind turbine is provided.

9 Claims, 7 Drawing Sheets

(51) Int. Cl.
*F03D 7/02* (2006.01)
*F03D 80/50* (2016.01)
*B23P 19/06* (2006.01)
*B23P 6/00* (2006.01)

(52) U.S. Cl.
CPC ..... *F05B 2240/50* (2013.01); *F05B 2260/301* (2013.01); *F16C 2360/31* (2013.01)

(56) References Cited

U.S. PATENT DOCUMENTS

| | | | |
|---|---|---|---|
| 2015/0047192 A1* | 2/2015 | Ebbesen | F03D 1/0658 |
| | | | 29/889.3 |
| 2016/0040649 A1 | 2/2016 | Smith et al. | |
| 2016/0327017 A1* | 11/2016 | Neumann | B23P 6/00 |

* cited by examiner

METHODS AND SYSTEMS FOR DISASSEMBLING A PITCH BEARING FROM A WIND TURBINE HUB

The present disclosure relates to methods for disassembling a pitch bearing from a hub of a wind turbine and methods for lowering a blade assembly from a hub of a wind turbine and a system for connecting or disconnecting a blade assembly to or from a hub.

BACKGROUND

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft drives the generator rotor either directly ("directly driven") or through the use of a gearbox. The gearbox (if present), the generator and other systems are usually mounted in a nacelle on top of a wind turbine tower.

Blades are generally coupled to the hub with a pitch bearing in between the blade and the hub through bolted connections comprising large numbers of bolts and nuts that may be accessible only from the outside. A pitch bearing comprises an inner ring and an outer ring. A wind turbine blade may be attached either at the inner ring or at the outer ring, whereas the hub is connected at the other. A blade may perform a relative rotational movement with respect to the hub when a pitch system is actuated. The bearing inner ring may therefore perform a rotational movement with respect to the bearing outer ring.

Pitch bearings may generally be actuated mechanically or hydraulically. In mechanical pitch systems a pinion may mesh with an annular gear provided on the bearing inner ring to set the wind turbine blade into rotation.

During operation of the wind turbine, forces may be acting on the blades that result in a constantly varying torque around the blade's longitudinal axis. These forces may include the aerodynamic torque around the longitudinal axis of the blade and also the weight of the blade which may exercise a torque around the blade's longitudinal axis, depending on the blade's position. Both these forces are non-constant, largely cyclical and tend to rotate the blade out of the position determined by the pitch control system. When a pitch system involving gearing is used, the varying torque may result in flanks of the teeth of the pinion and annular gear repeatedly touching each other. This repetitive contact may lead to fretting corrosion and premature wear, especially affecting the annular gear of the bearing inner ring. Although there are some solutions that attempt to reduce fretting corrosion, annular gears occasionally need to be repaired or replaced. Annular gears may be machined directly on the inner ring of the pitch bearing. Repairing or replacing an annular gear can generally not be performed while the pitch bearing is mounted on the hub. Therefore, the pitch bearing needs to be disassembled from the hub and lowered to be repaired or replaced on the ground level.

In addition, such forces directly affect the operating life of the pitch bearing. Deformations in the surrounding components of such pitch bearings are asymmetric. As a consequence, the distribution of contact forces and contact angles on the pitch bearing is not uniform. This can give rise to brinelling in bearing races. Therefore, pitch bearings may prematurely fail. Attempts to at least reduce the impact of dynamic loads on the pitch bearings, e.g. reinforcing the bearings, have been proposed. However, despite these solutions, repairing the pitch bearing still needs to be performed in a considerable number of wind turbines. Repairing the pitch bearing generally implies disassembling the blade and then the pitch bearing from the hub and lowering to be repaired.

However, disassembling a pitch bearing or blade from a hub often involves costly operations since bolts and nuts connecting the pitch bearing to the hub are usually difficult to access. In particular, in those cases where the outer ring of the pitch bearing is bolted to the hub. In these cases, bolts are inserted from the hub into openings formed in the hub and in the outer ring, and nuts are fastened to the bolts from the exterior of the hub for connecting the outer ring and the hub. By loosening and removing all the nuts, the outer ring, and thus the whole pitch bearing, may be disassembled from the hub. Nevertheless, an operator cannot remove all the nuts from inside the hub when a blade is connected to the inner ring.

For this reason, long and complex operations are usually required. These methods may comprise rotating the hub with one blade in a 3 o'clock position, i.e. one blade in horizontal position, unscrewing the bolts connecting the inner ring of the bearing from the blade, removing the blade from the hub and lowering the blade in a substantially horizontal position with a crane. Then, the hub is rotated to a 12 o'clock position, i.e. the bearing of the removed blade is positioned on the top of the hub. In this position, an operator may have access to the nuts connecting the hub and the outer ring of the bearing in a safe manner, i.e. reducing the risk of falling as it could happen if the hub was in a 3 o'clock position. Then, the nuts may be removed from inside the hub and the pitch bearing may be removed from the hub with a crane. After repairing or replacing the pitch bearing on the ground level, the bearing has to be lifted and connected to the hub in a 12 o'clock position. Then, the hub is rotated to a 3 o'clock position and the blade is lifted in a substantially horizontal position with a crane and connected to the inner ring of the bearing. This has to be repeated for each blade. These methods are inefficient because they involve many rotations of the hub from one position to another. Rotating the hub may require a considerable long time, e.g. around one hour approximately. During this rotation, the heavy and expensive cranes that are necessary for hoisting are idle.

On the other hand, it is known to provide external platforms or guides on the hub for allowing an operator removing the nuts. However, such external platforms or guides generally require reinforcing the hub and increase the manufacturing cost of the wind turbine.

SUMMARY

In a first aspect, a method of lowering a blade assembly comprising a wind turbine blade and a pitch bearing from a wind turbine hub is provided. The pitch bearing comprises an inner bearing ring connected to the blade and an outer bearing ring connected to the wind turbine hub. The method comprises positioning the wind turbine blade in a substantially horizontal position, holding the wind turbine blade in the substantially horizontal position with a crane, removing the blade assembly from the hub and lowering the blade assembly with the crane.

According to this aspect, the pitch bearing and the blade, i.e. the blade assembly, may be disconnected from the hub and lowered in a single operation. As a result, rotating the hub for positioning the pitch bearing in position for first removing the blade and then removing the bearing is no longer necessary. As the number of rotations of the hub may be reduced, the time for which a crane is waiting for the following operation may drastically be reduced. Consequently, the use of the cranes may be more efficient than in previous methods and lowering a blade assembly may thus be cheaper. Total time for lowering the pitch bearing may additionally be reduced.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
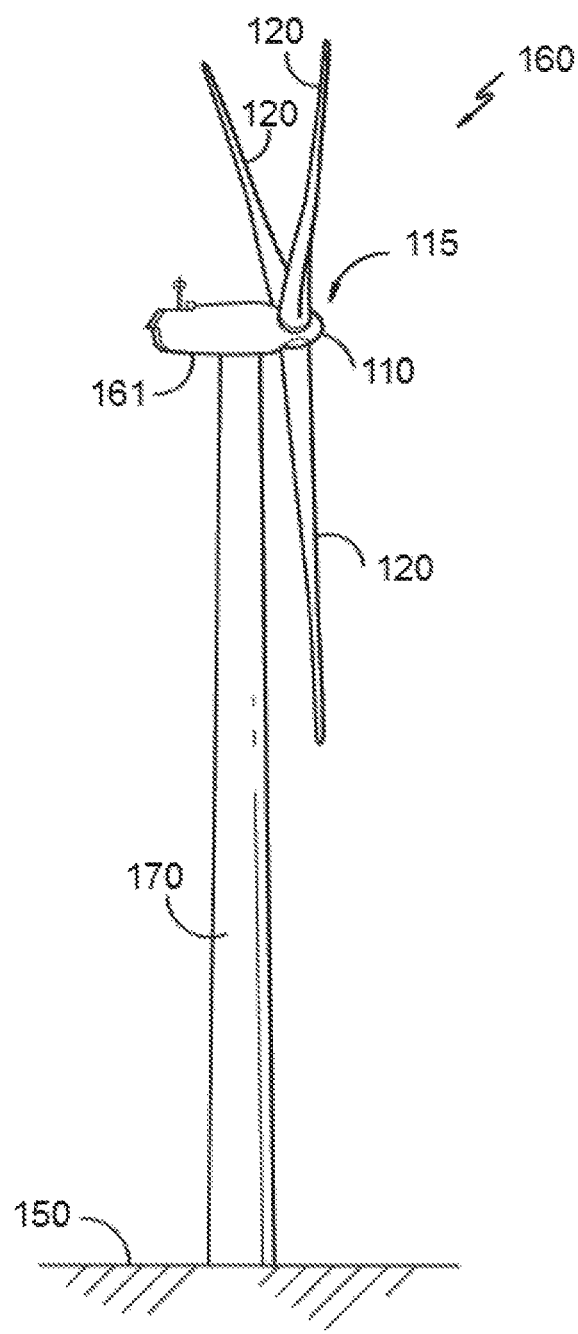
FIG. 1 illustrates a perspective view of a wind turbine according to one example.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
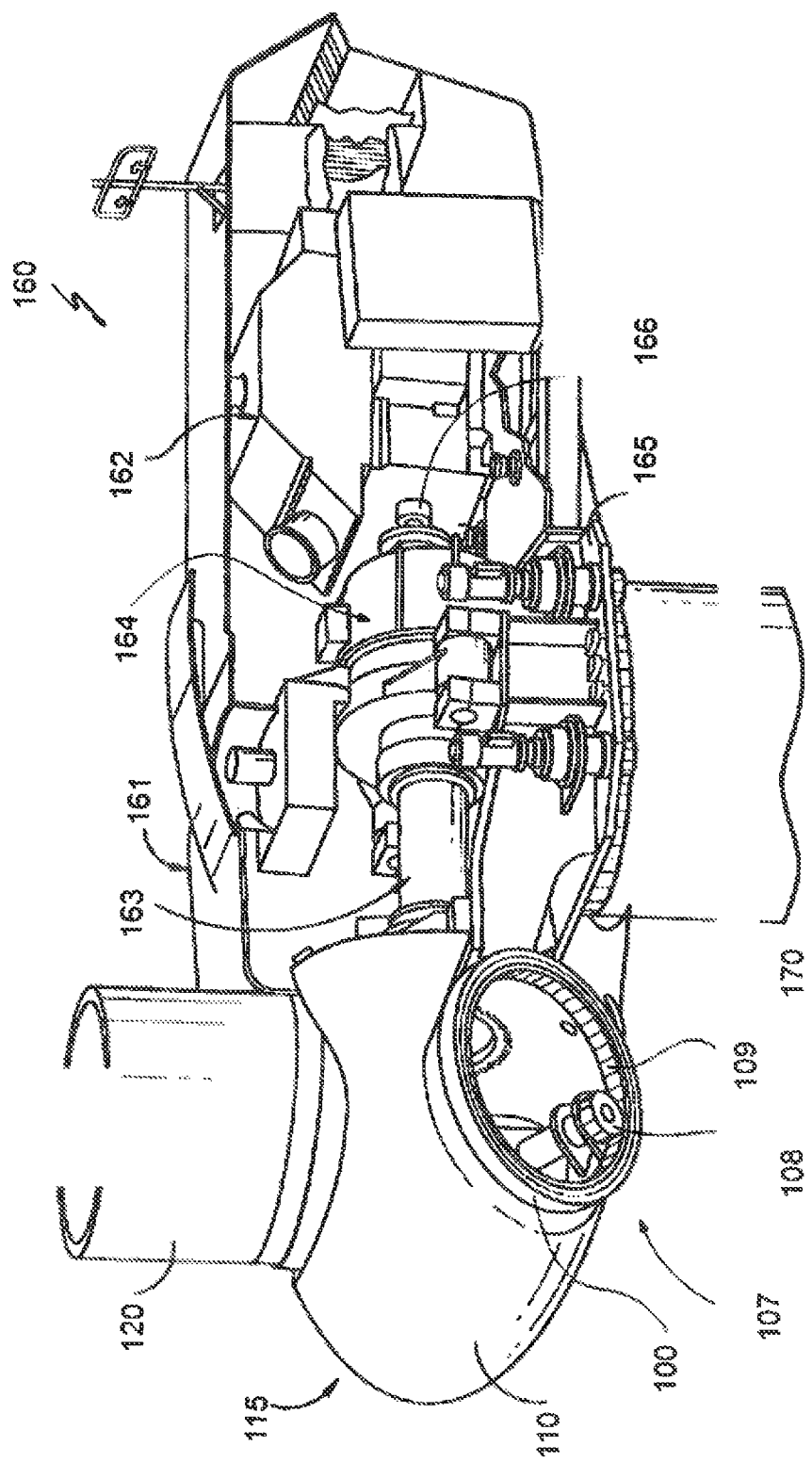
FIG. 2 illustrates a detailed, internal view of a nacelle of a wind turbine according to one example.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

Blades 120 are coupled to the hub 110 with a pitch bearing 100 in between the blade 120 and the hub 110. The pitch bearing 100 comprises an inner ring and an outer ring (shown in FIG. 3). A wind turbine blade may be attached either at the inner bearing ring or at the outer bearing ring, whereas the hub is connected at the other. A blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that mesh with an annular gear 109 provided on the inner bearing ring to set the wind turbine blade into rotation.

Figure 3:
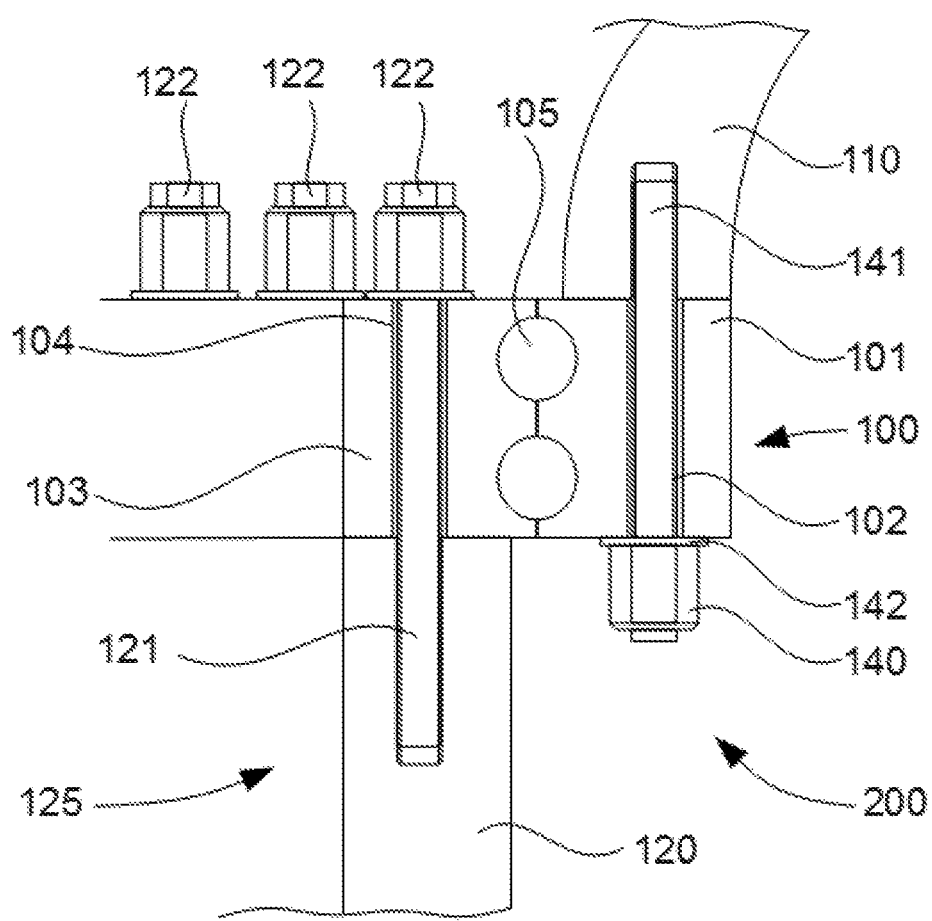
FIG. 3 shows an example of a blade assembly connected to a wind turbine hub.

FIG. 3 shows an example of a wind turbine blade assembly 200 connected to a wind turbine hub 110. The wind turbine blade assembly 200 comprises a pitch bearing 100 and a blade 120. The pitch bearing 100 comprises an outer ring 101 and inner ring 103. The outer ring 101 and the inner ring 103 may be cylindrical. The pitch bearing comprises rolling elements 105, e.g. balls or rollers, located between the outer bearing ring 101 and the inner bearing ring 103 so as to allow the rotation of the inner bearing ring 103 with respect to the outer bearing ring 101. The outer ring and the inner ring comprise respectively outer ring openings 102 and inner ring openings 104 for fastening the pitch bearing to the blade and to the hub.

In the example of FIG. 3, the inner ring 103 is connected to a wind turbine blade 120 through a bolted connection. A blade bolt 121 may be inserted through an inner ring opening 104. One end of the blade bolt 121 may be fastened, e.g. threaded or screwed, to the wind turbine blade 120. A blade nut 122 may be fastened, e.g. threaded or screwed, to the blade bolt 121 at the other end. Several blade nuts 122 and blade bolts 121 may be arranged on the blade and pitch connection, e.g. between forty and one hundred and fifty, along the inner bearing ring. Blade nuts 122 may be unscrewed from the blade bolts 121 from the interior of the hub 110. After unscrewing and removing the blade nuts 122, the blade 120 can be disconnected from the inner ring 103, and thus from the wind turbine hub 110. Several attachment configurations may be used for securing bolts to the blade as T-bolts or steel bushings having an internal thread inserted on the blade.

In addition, the outer bearing ring 101 is connected to a wind turbine hub 110 through a bolted connection. A hub bolt 141 may be inserted through an outer ring opening 102. A hub bolt 141 may be connected, e.g. threaded or screwed, to the wind turbine hub 110 at one end. The other end of the hub bolt 141 may be secured to a hub nut 140 for fastening the outer ring 101 to the hub 110. A washer 142 may additionally be arranged between the outer ring 101 and the hub nut 140. In some examples (not shown in this FIG. 3), a plastic cap may be mounted on the hub nut 140 for protecting the nut from the weather.

The connection between the hub 110 and the pitch bearing 100 comprises several hub nuts 140 and hub bolts 141. The number of hub bolts 141 may depend on the size of the bolts and on the diameter of the blade root 125. In some examples, the number of bolts may be between forty and one hundred and fifty arranged along the outer bearing ring. For disconnecting the pitch bearing 100 from the wind turbine hub 110, hub nuts 140 can be unscrewed and removed from the hub bolts 141. Then, the outer ring 101, and consequently the pitch bearing 100, can be disassembled from the hub 110. The wind turbine blade assembly 200, i.e. the pitch bearing 100 and the blade 120, can therefore be disassembled from the hub 110 by removing the hub nuts 140.

In these examples, hub nuts 140 cannot be unscrewed by an operator from the interior of the hub 110, or at least all of the hub nuts. Therefore, the blade assembly 200 cannot be removed from the interior of the hub 110.

Figure 4:
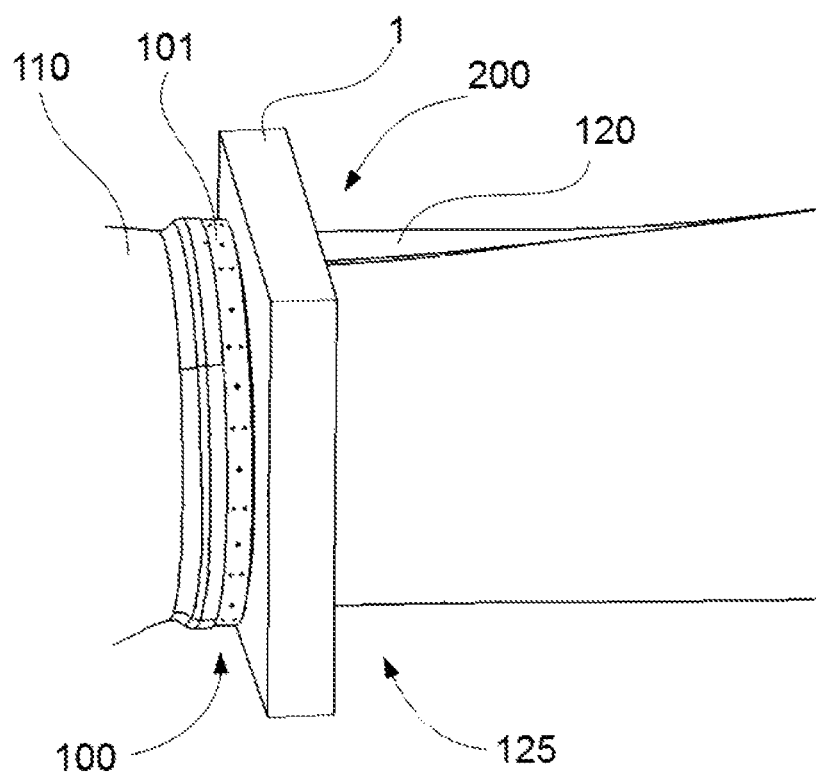
FIG. 4 schematically represents placing a tool on a portion of a wind turbine blade.

FIG. 4 schematically represents placing a tool 1 on a wind turbine blade 120 for disassembling a pitch bearing 100 or a blade assembly 200 having a blade 120 and a pitch bearing 100.

The tool 1 comprises a socket wrench (not shown in FIG. 4) for unscrewing the hub bolts (not shown) connecting the hub 110 to the pitch bearing 100 as will be explained in further detail below. In the examples according to the FIG. 4, the outer bearing ring 101 is bolted to the hub 110. The socket wrench is configured to tighten and loosen the hub nuts and may be positioned along the outer pitch ring 101 for engaging the nuts of the bolted connection between the pitch bearing 100 and the hub 110.

In these examples, the tool 1 may be placed on the blade at or near the blade root 125, specifically on the outer surface of the blade root. The tool 1 may completely or partially surround the blade root 125. The tool may therefore be supported by the blade. The tool may be located close to the hub nuts to be removed. In some examples the tool 1 may partially rest on the outer ring 101, for example one side of the tool 1 may rest on one side of the outer ring 101. According to this aspect, the socket wrench(es) may easily engage the hub nuts 141.

Alternatively or additionally, the tool may be placed on the blade for connecting a blade assembly to a hub. In the case of assembly, instead of removing nuts with the socket wrench, hub nuts may be screwed to hub bolts for fastening the blade assembly to the hub.

In some examples, instead of being placed on a portion of a wind turbine blade, the tool may be placed on the hub.

Figure 5:
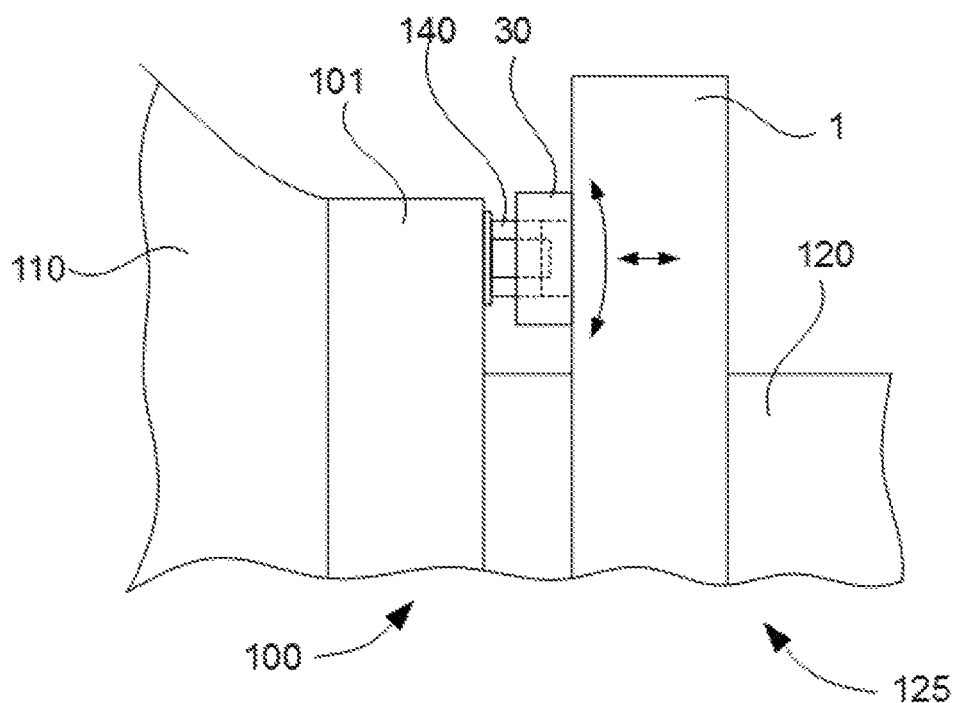
FIG. 5 schematically represents a detail of removing a nut with a socket wrench of a tool placed on a blade.

FIG. 5 schematically represents a detail of removing a nut, e.g. hub nut 140, with a socket wrench 30 of a tool 1 placed on a portion of a blade 120.

As with respect to the FIG. 4, the tool 1 is placed on the blade at or near the blade root 125. A socket wrench 30 engages a nut, e.g. a hub nut 140, which connects an outer ring 101 of a pitch bearing 100 to the hub 110. The socket wrench unscrews the hub nut 140. In addition, the socket wrench 30 may remove the hub nut 140 from the hub bolt 141. In this way, the socket wrench 30 may be configured to have a rotational and a linear movement for tightening or loosening a nut. Therefore, a nut may be completely removed from a bolt by the socket wrench.

After removing a first nut, the socket wrench may be positioned to engage a second nut of the bolted connection between the hub and the pitch bearing, i.e. may be repositioned to engage another nut. Then, this second nut may be removed and the socket wrench may be positioned to engage and to remove a third nut. The remaining nuts may be successively removed in a similar way. Positioning the socket wrench and removing a nut may be successively repeated for each of the remaining nuts.

Consequently, all of the nuts, e.g. hub nuts 140, connecting the hub 110 and the pitch bearing 100, e.g. the outer ring 101, may be removed by the socket wrench(es).

In some examples, positioning (and repositioning) the socket wrench (or the socket wrenches) may comprise rotating the tool around the blade, and consequently also rotating the socket wrench (or the socket wrenches). Alternatively, the tool may be kept fixed with respect to the blade, while the socket wrench(es) may rotate around the tool, e.g. the socket wrench(es) may displace along the tool.

Further details on the tool and on the socket wrenches will be explained below with respect to the FIGS. 6 and 7.

Figure 6:
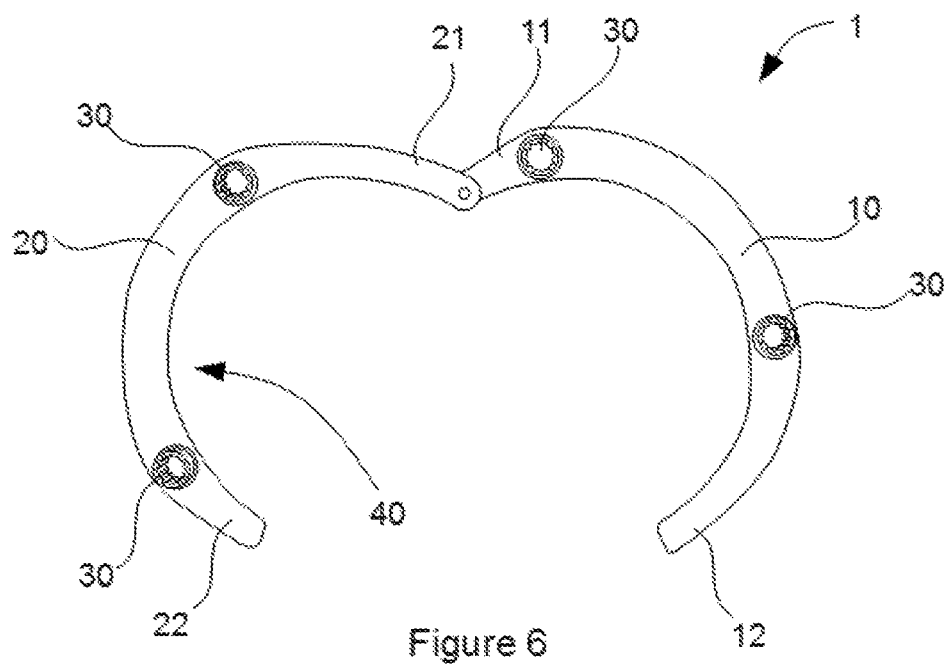
FIG. 6 shows an example of a tool for connecting or disconnecting a wind turbine blade assembly to or from a hub of a wind turbine in an open position.
Figure 7:
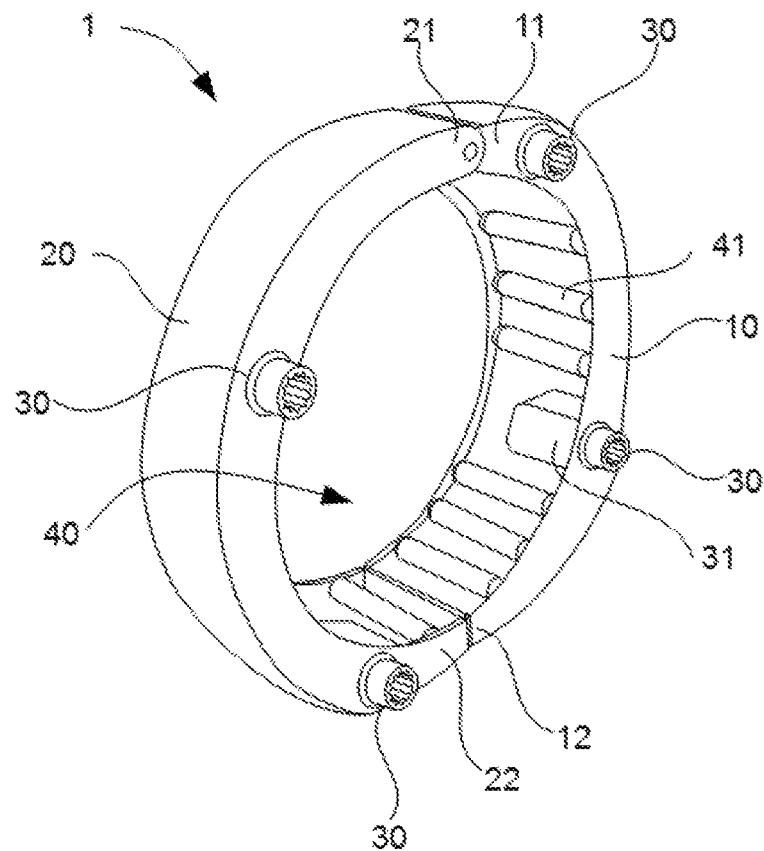
FIG. 7 shows the example of the tool of FIG. 6 in a closed position.

FIG. 6 and FIG. 7 respectively show an example of a tool 1 for connecting or disconnecting a wind turbine blade assembly to or from a hub of a wind turbine in an open position and in a closed position.

A tool 1 for connecting or disconnecting a wind turbine blade assembly to or from a wind turbine hub comprises a socket wrench 30 configured to tighten and loosen a nut of a bolted connection between a blade assembly and a hub. The tool 1 additionally comprises a first frame arm 10 having a first end 11 and a second end 12 and a second frame arm 20 having a first end 21 and a second end 22. The first end of the first frame arm 11 and the first end of the second frame 21 may be pivotally connected. Furthermore, the tool 1 is configured to engage a portion of a wind turbine blade and to rotate the socket wrench 30 around a portion of a wind turbine blade.

In some examples, the second end of the first frame arm 12 and the second end of the second frame arm 22 may be configured to be releasably connected for opening and closing the tool. The tool 1 may therefore clamp a portion of wind turbine blade, e.g. at the blade root, perpendicular to the longitudinal axis of a blade. Having an open and a closed position allows placing the tool around the portion of a blade which is connected to a hub. In this way, a crane may lift and place the tool relatively close to the nuts to be removed. A tool in an open position may at least partially surround a wind turbine blade portion, e.g. a blade root. By relatively moving the first frame arm 10 towards the second frame arm 20 until the second ends of the two frame arms may be connected, the tool may close. The portion of the blade is thus clamped by the tool, e.g. between the first frame arm 10 and the second frame arm 20.

In some examples, the tool may be configured to engage a portion of a wind turbine hub.

As the tool 1 is configured to rotate the socket wrench 30 around a portion of a blade, the socket wrench may be positioned wherever the nuts connecting the blade assembly are located (for dissembling the blade assembly from the hub) or wherever the nuts have to be screwed for connecting the blade assembly to the hub are located.

The tool 1 of the FIGS. 6 and 7 comprises four socket wrenches. In other examples, the tool may comprise a different number of socket wrenches, e.g. one or two socket wrenches. Having more socket wrenches, e.g. more than four, the tool may speed up connecting or disconnecting the blade assembly to or from a hub.

Socket wrenches 30 are configured to tighten and loosen the nuts of the connection of a blade assembly and the hub, e.g. an outer ring of a pitch bearing and a hub. Socket wrenches 30 comprise an internal cavity that fits the external shape of the nuts. Therefore, nuts, for example hub nuts, may be received by the socket wrenches. Once a nut is received by a socket wrench and the socket wrench fits the nut, moving the socket wrench may screw or unscrew the nut. In addition, the socket wrench may be configured to completely remove a nut. In some examples, the socket wrench(es) may further be configured to remove a washer and/or a plastic cap from a bolted connection between a blade assembly and a hub.

In some examples, the socket wrench 30 (or the socket wrenches) may be configured to have a rotational and a linear movement for tightening or loosening a nut, i.e. a helical movement.

In some examples, the tool 1 may comprise an internally threaded sleeve (not shown in FIG. 6 or 7) for engaging an external thread arranged on the socket wrench 30. In this way, the socket 30 wrench may be screwed and unscrewed with respect to the tool 10, i.e. with respect to the internally threaded sleeve. Therefore, the socket wrench may provide a rotational and a linear movement, i.e. a helical movement, and it may remove the nuts.

Alternatively, the tool may comprise an articulated socket arm connected to the socket wrench. Such an articulated socket arm may provide a linear and a rotational movement, i.e. helical movement, to the socket wrench for unscrewing and removing the nuts. In some examples, each of the socket wrenches may comprise an articulated socket arm connecting the structure of the tool, e.g. the first frame arm 10 and the second first arm 20, to the socket wrench.

In some examples, the socket wrench 30 may comprise a hydraulic actuator 31 for directly or indirectly actuating the socket wrench. In this aspect, the hydraulic actuator 31 may push the socket wrench 30 along a sleeve, i.e. the socket wrench may advance along the sleeve by the push of the hydraulic actuator. Alternative, the hydraulic actuator may be connected to the articulated socket. The articulated socket may transform the movement of the hydraulic actuator to a rotational and a linear movement, i.e. to a helical movement. In some examples, each of the socket wrenches may comprise a sleeve and a hydraulic actuator for pushing the socket wrench away from the tool, e.g. for pushing the socket wrench along the longitudinal axis of a blade.

The tool represented in the FIGS. 6 and 7 may further comprise a rotating system 40 for rotating the tool around the portion of the blade. When the rotating system 40 is activated, the tool may be rotated for positioning the socket wrench on the position of the following nut to be tightened or loosened, i.e. screwed or unscrewed. The socket wrench may then engage the nut and tighten or loosening it. After that, the rotating system may again be activated for rotating once more for positioning the socket wrench on the following nut.

In some examples, the rotating system 40 may comprise rollers 41 for rolling around the portion of the blade, e.g. around the blade root. Rollers 41 may be arranged substantially parallel to the longitudinal axis of the wind turbine blade. Moving the rollers around its own axis provides a rotation of the tool with respect to the blade.

In some examples, rollers 41 may be driven by a motor that can control the angle of rotation of the tool, e.g. an electrical motor. The rotating system 40 may thus comprise a motor for driving the rollers 41. In some examples, the rotating system 40 may comprise drivable rollers and freewheel rollers.

Rotating the whole tool around the portion of the portion of the blade may allow having a deposit for storing e.g. nuts or washers or plastic caps that have been removed or that will be inserted. A deposit may be associated with each of the socket wrenches. In this way, removing and/or inserting nuts may be automatized. In addition, in those cases where the blade assembly is first disassembled and then assembled after e.g. replacing the bearing, the same nuts removed from hub may be re-used for fastening the pitch bearing to the hub. The risk of falling or losing the nuts and/or the washers may consequently be reduced.

In some examples, the tool 1 may comprise a displacing actuator and a guide for displacing and guiding the socket wrench along the tool. In this way, the socket wrench may be displaced along the tool for positioning the socket wrench on the position of the following nut to be tightened or loosened. Therefore, the socket wrench may rotate around the portion of the blade, e.g. around the longitudinal axis of the blade. In these examples, the displacing actuator may displace the socket wrench with respect to the structure of the tool, e.g. the first frame arm and/or the second frame arm. In some examples, the guide for guiding the socket wrench along the tool may be the first frame and/or the second frame arm. In other examples, the tool may comprise a separated guide. In some examples, a displacing actuator may displace the socket wrenches or some of the socket wrenches with respect to the tool, i.e. along the guide. Alternatively, a displacing actuator may be associated with a socket wrench and each of the socket wrenches may thus be independently displaced, e.g. rotated with respect to the structure of the tool.

In some examples, the displacing actuator may be activated by a motor, specifically an electrical motor. In other examples, the displacing actuator may be activated by other suitable systems, such as a hydraulic or pneumatic system.

In some examples, the tool 1 may comprise a rotating system 40 and a displacing actuator and a guide. In this way, the socket or the socket wrenches may be more precisely positioned.

In some examples, the tool may comprise a position detector, e.g. a camera or a laser detector, for detecting the position of a nut to be tightened or loosened. The position detector may be coupled to the rotating system and/or to the displacing actuator for displacing the socket wrench along the tool. In this way, the socket wrench or the socket wrenches may be automatically positioned on the position of the following nut or of the following bolt when a nut is to be inserted. The position detector may additionally be configured to detect if the bolted connection comprise a washer and/or a plastic cap.

In some examples, the tool may comprise an adjustment system for adjusting the tool from the open to the closed position. In this way, closing and opening the tool may be automatically or remotely controlled. This may allow reducing assembly and/or disassembly times. The adjustment system may comprise a hydraulic or a pneumatic system.

The tool 1 may be substantially circular. In this aspect, the first frame arm 10 may be substantially semicircular. Additionally or alternatively, the second frame arm 20 may be substantially semicircular. The tool may thus be adapted to the outer surface of the blade portion, e.g. adapted to the outer surface of the blade root.

In some examples, the tool may comprise a cushioning system that exerts enough pressure to the blade for keeping the tool in a desired position without affecting the structural integrity of the blade.

The tool 1 according to any of the examples herein disclosed may be used in any of the methods for disassembling and/or assembling a pitch bearing from or to a hub, for disassembling and/or assembling a blade assembly from or to a hub and for lowering and/or lifting a blade assembly herein disclosed as will be explained in further detail below.

Figure 8:
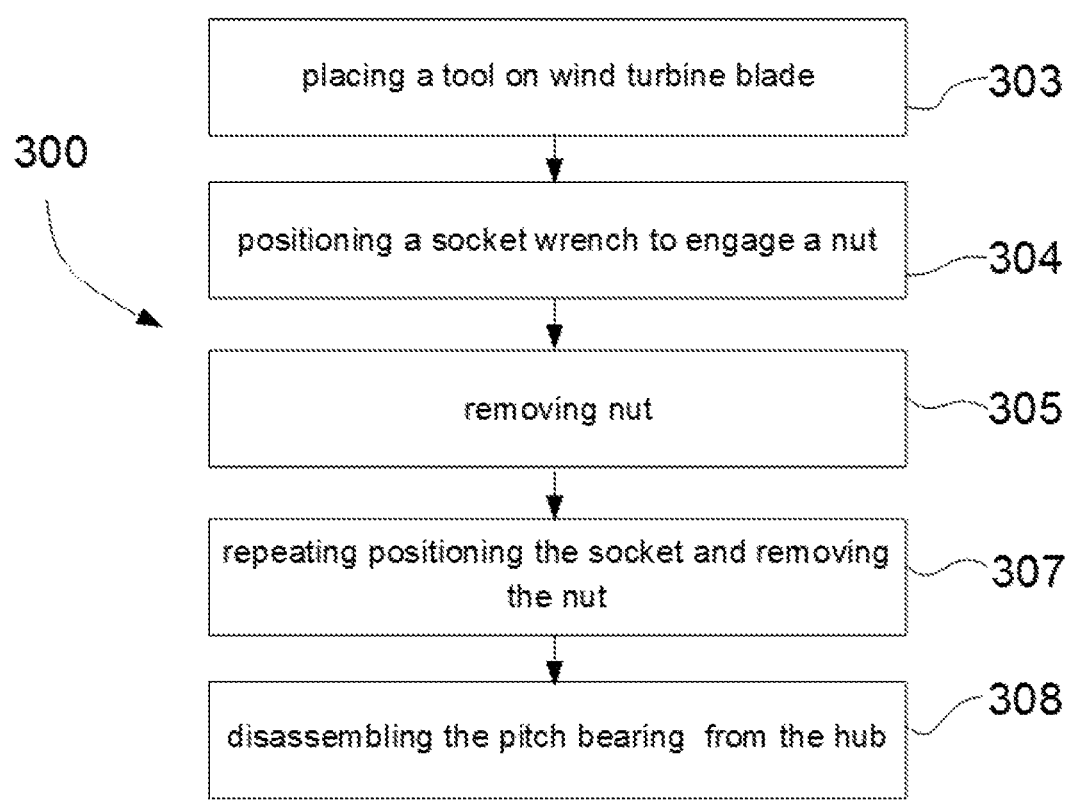
FIG. 8 shows a flow diagram representing a method of disassembling a pitch bearing according to one example.

FIG. 8 shows a flow diagram representing a method of disassembling 300 a pitch bearing 100 from a wind turbine hub 110 according to one example. The pitch bearing is bolted to a wind turbine hub 110 and to a wind turbine blade 120.

The method of disassembling 300 a pitch bearing 100 from a hub 110 according to the FIG. 8 comprises placing 303 a tool 1 on a portion of the wind turbine blade 120 having a socket wrench 30 and positioning 304 the socket wrench 30 to engage a nut 140 of the bolted connection between the hub 110 and the pitch bearing 100. In addition, the method comprises removing 305 the nut, e.g. the hub nut 140, and repeating 307 positioning 304 the socket wrench 30 to engage a nut 140 and removing 305 the nut 140 for the remaining nuts of the bolted connection between the hub 110 and the pitch bearing 100, i.e. repositioning the socket wrench to engage another nut and removing said nut for the remaining nuts. The method further comprises disassembling 308 the pitch bearing 100 from the hub 110, i.e. removing the pitch bearing from the hub.

According to this aspect, a pitch bearing is disassembled from the hub, i.e. removed from the hub, by removing the nuts connecting the bearing to the hub with a socket wrench mounted in a tool placed on a blade. Removing the nuts may comprise unscrewing the nuts from the bolts. Therefore, operators accessing the nuts may not be required.

In addition, as removing the nuts is performed by the socket wrench of the tool, no direct intervention from the operators may be required. Therefore, operations involving health and safety risks may be avoided. The method may therefore provide a safer method than known methods.

Furthermore, the tool having a socket wrench may be used in different wind turbines. Therefore, reinforcements or platforms for allowing an operator accessing the nuts may not be required. This may imply a reduction of manufacturing costs of the wind turbine. As the tool may be used in different wind turbines, even in different models of wind turbines, the overall costs of removing a pitch bearing taking into account both manufacturing the wind turbine and the method of removing the pitch bearing may also be reduced.

In some examples, the pitch bearing 100 may comprise an outer ring 101 and an inner ring 103. The outer ring 101 may be bolted to a hub 110 and the inner ring 103 to a wind turbine blade 120.

In some examples, the tool 1 used in the method of disassembling 300 a pitch bearing may be a tool 1 according to any of the examples herein described.

In some examples, placing 303 the tool on a portion of the blade may comprise opening and closing the tool 1 for securing the tool to the blade. The portion of the blade, e.g. the blade root 125, may thus be surrounded by the tool 1.

In some examples, positioning 304 the socket wrench 30 may comprise rotating the tool 1 around the blade 120, e.g. around the blade root 125. In this way, the socket wrench or the socket wrenches may engage the remaining nuts of the bolted connection, e.g. may engage the remaining hub nuts of the connection between the outer ring and the hub.

Alternatively or additionally, positioning 304 the socket wrench 30, may comprise displacing the socket wrench along the tool 1. The socket wrench(es) may also engage the remaining nuts of the bolted connection.

In some examples, positioning 304 the socket wrench 30, may further comprise detecting the position of the nut 140 to be removed. The socket wrench 30 may thus be more precisely positioned.

In some examples, the method 300 may further comprise rotating the hub 110 to a position wherein the blade 120 connected to the pitch bearing 100 to be disassembled is in a 3 o'clock position. The method may therefore comprise positioning the blade in a substantially horizontal position. According to this, the bearing may be more easily removed. In addition, the blade may be held, e.g. by a crane, in the substantially horizontal position for maintaining the blade in the substantially horizontal position and avoiding that the blade could fall down.

Additionally, the method may comprise lowering the pitch bearing to the support surface, e.g. a ground level. Lowering the pitch bearing may also comprise lowering the blade connected to the pitch bearing. In this way, the blade assembly, e.g. a blade and the pitch bearing, may be removed from the wind turbine and lowered to a ground level.

In some examples, the method may further comprise disconnecting the pitch bearing 100 from the blade 120 on a support surface, e.g. a ground level, after lowering the blade at least partially connected to the pitch bearing. The pitch bearing 100 may therefore be repaired or replaced. The inner bearing ring 103 may be bolted to a wind turbine blade 120 as described with respect to the FIG. 3. In some examples, disconnecting the pitch bearing 100 from the blade 120, e.g. unscrewing the blade nuts 122, may be entirely performed when the blade assembly 200 is on the ground level. However, in other examples, unscrewing some blade nuts 122 may be performed by an operator from the interior of the hub while the socket wrench 30 is removing the hub nuts 140. In this way, disassembling a pitch bearing for repairing or replacing it may be optimized, since an operator or a similar tool may unscrew some of the blade nuts 122 at the same time than the tool is unscrewing the hub nuts 140.

In yet further examples, the method of disassembling a pitch bearing 100 from a wind turbine hub 110 may comprise placing 303 a tool having a socket wrench 30 on a portion of the wind turbine blade 120; removing nuts 140 that connect the pitch bearing 100 to the hub 110 comprising unscrewing each of the nuts 140 with the socket wrench(es) 30 and rotating the socket wrench(es) 30 around the portion of the blade for positioning the socket wrench 30 from one nut the following one for unscrewing each of the nuts; and disassembling 308 the pitch bearing 100 from the hub. In addition, the methods according to these examples may further comprise positioning the blade in a substantially horizontal position and holding the wind turbine blade in this position.

In some further examples, the method of disassembling a pitch bearing 100 from a wind turbine hub 110 may additionally comprise repairing or replacing a pitch bearing. According to these examples, a pitch bearing 100 at least partially connected to a blade 120, i.e. a blade assembly 200, is lowered to a ground level according to any of the examples herein described. Then, the pitch bearing may be repaired or replaced.

Repairing and replacing a pitch bearing may comprise disconnecting the pitch bearing from the blade according to any of the examples herein described. A new or a repaired pitch bearing may be at least partially connected to the blade forming a blade assembly, by for example inserting the blade bolts through the inner ring openings 104 and fastening some blade nuts 122 on some of the blade bolts 121. Such a blade assembly 200 formed by a wind turbine blade and a repaired or a replaced pitch bearing may be assembled with the hub.

The blade assembly 200 may be lifted and positioned in front of the hub bolts 141 connected to the hub 110. In some examples, the hub may have been previously rotated for positioning the receiving portion of the hub in such a way that the blade assembly may be connected in a substantially horizontal position, i.e. the blade to be connected is in a 3 o'clock position. These hub bolts 141 may then be inserted through the outer ring openings 102. After that, the socket wrench 30 of the tool may screw the hub nuts 140 on the hub bolts 141 and the pitch bearing, and consequently the blade assembly 200, may thus be assembled with the hub. In addition, blade nuts 122 may be screwed on the remaining (if any) blade bolts 121 and the pitch may thus be completely connected to the blade.

The method of disassembling a pitch bearing at least partially connected to a wind turbine blade, i.e. a blade assembly, may therefore comprise lowering a pitch bearing and a blade, i.e. a blade assembly; disconnecting the pitch bearing from the blade, repairing or replacing the pitch bearing; at least partially connecting the repaired or replaced pitch bearing to the blade forming a repaired blade assembly; lifting the repaired blade assembly and assembling the repaired blade assembly with the hub.

In some examples, after assembling a repaired blade assembly with the hub, i.e. a blade assembly formed by a blade and a repaired or replaced pitch bearing, the hub may be rotated 120°. The hub may therefore be positioned having a next pitch bearing to be assembled with the hub or to be disassembled from the hub in a 3'o clock position. The method may thus comprise positioning the wind turbine hub having a blade of a next blade assembly to be disassembled from the wind turbine in a 3'o clock position. Then, the pitch bearing of the next blade assembly may be disconnected from the hub according to any of the examples herein disclosed. As previously described, the pitch bearing may be replaced or repaired and the blade assembly including a repaired or replaced pitch bearing may be connected to the hub. Then, the hub may again be rotated 120° and the next pitch bearing may additionally be disconnected.

Figure 9:
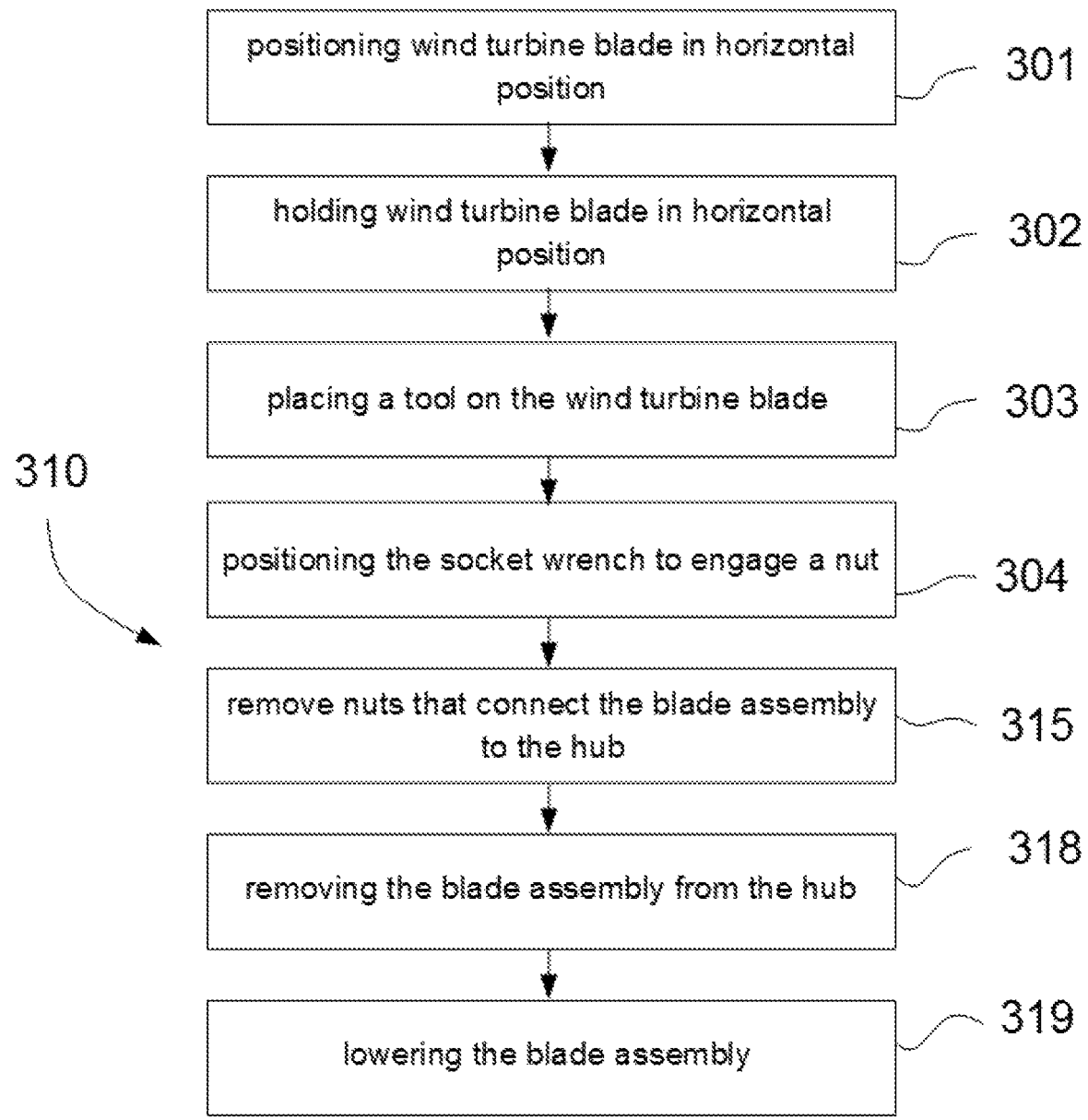
FIG. 9 shows a flow diagram representing a method of lowering a wind turbine assembly according to one example.

FIG. 9 shows a flow diagram representing a method of lowering 310 a wind turbine assembly 200 having a pitch bearing 100 and a wind turbine blade 120 from a wind turbine hub 110, wherein the pitch bearing comprises an inner bearing ring connected to the blade and an outer bearing ring connected to the wind turbine hub, according to one example.

The method of lowering 310 a wind turbine assembly 200 from a hub 110 according to the FIG. 9 comprises positioning 301 the wind turbine blade 120 in a substantially horizontal position and holding 302 the wind turbine blade 120 in the substantially horizontal position with a crane. The hub 110 may thus be rotated to a 3 o'clock position. The method additionally comprises removing 318 the blade assembly 200 from the hub 110 and lowering 319 the blade assembly 200 with the crane.

The method may optionally comprise placing 303 a tool 1 having a socket wrench 30 on a portion of the wind turbine blade 120, e.g. on the blade at or near the blade root 125. Furthermore, the method of lowering 310 a blade assembly may optionally comprise removing 315 nuts 140 that connect the blade assembly 200 to the hub 110.

Removing such nuts may comprise unscrewing each of the nuts 140 with the socket wrench 30 and rotating the socket wrench 30 around the portion of the blade for positioning the socket wrench 30 from one nut to the following nut for unscrewing each of the nuts.

In these methods, the tool 1 and the socket wrenches 30 may be according to any of the examples herein described.

In some examples, rotating the socket wrench 30 around the portion of the blade may comprise rotating the tool 1 around the portion of the blade, e.g. around the blade root 125. Alternatively or additionally, rotating the socket wrench 30 around the portion of the blade may comprise displacing the socket wrench 30 along the tool 1.

In some examples, the method of lowering a blade assembly may further comprise detecting the position of the nut to be unscrewed as described in accordance with previous examples.

Placing the tool on the portion of the blade may comprise opening and closing the tool 1 for securing the tool to the blade.

In some examples, lowering a blade assembly may comprise disassembling a pitch bearing from a hub according to any of the methods of disassembling a pitch bearing from a hub previously described.

In some examples, the method of lowering a blade assembly may further comprise disconnecting the pitch bearing from the blade according to any of the examples herein described, repairing or replacing the pitch bearing according to any of the examples herein described and at least partially connecting the repaired or replaced pitch bearing to the blade forming a repaired blade assembly according to any of the examples herein described.

In addition, the method of lowering a blade assembly may comprise hoisting the repaired blade assembly. The repaired blade assembly may then be assembled with the hub according to any of the examples herein described.

In a further aspect, a method of assembling a pitch bearing with a wind turbine hub 110 is provided. The method may comprise placing 303 a tool according to any of the examples herein described on a portion of a blade; inserting a nut on the socket wrench 30; positioning the socket wrench 30 for fastening the nut on a bolt; screwing the nut on the bolt; and repeating inserting a nut on the socket wrench and positioning the socket wrench and screwing the nut on the bolt for the remaining bolts. In addition, the method may comprise at least partially connecting the pitch bearing, e.g. a new pitch bearing or a repaired pitch bearing, to the blade and lifting the pitch bearing connected to the blade, i.e. lifting the blade assembly.

In some examples, the method of assembling a pitch bearing with a wind turbine hub 110 may comprise inserting bolts trough the openings of the pitch. According to this aspect, the method may comprise securing the hub bolts 141 to the hub 110, inserting the hub bolts 141 through the openings 102 of the outer ring 101.

In some examples, the method may further comprises positioning the hub in a 3 o'clock position for inserting the hub bolts 141 through the openings 102 of the outer ring 101.

In some examples, the method of assembling a pitch bearing with the hub may be a part of a method of disassembling a pitch bearing or of a method of lowering a blade assembly according to any of the examples herein described.

In some examples, after assembling one blade assembly with the hub, the method may additionally comprise positioning the hub for receiving a second blade assembly in a 3 o'clock position or for disassembling a next blade assembly. This second blade assembly may be mounted to the hub or disassembled from the hub according to any of the methods previously described. Similarly, a third blade assembly may be dismounted and/or mounted on the hub.

In yet a further aspect, a method of repairing or replacing a pitch bearing is provided. A method of repairing or replacing a pitch bearing may comprise disassembling 300 a pitch bearing from a hub or lowering 310 a blade assembly from the wind turbine blade according to any of the methods herein disclosed. In addition such a method may comprise disconnecting the pitch bearing from a blade, repairing or replacing the pitch bearing and connecting the repaired or the new pitch bearing to the blade. The method may further comprise lifting the blade assembly, i.e. the replaced or repaired pitch bearing connected to the blade, and connecting the pitch bearing to the hub by screwing the nuts to the bolts with a tool according to any of the examples herein described. In some examples, the method of repairing or replacing a pitch bearing may be a part of any of the methods of disassembling a pitch bearing or blade assembly previously described.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method of disassembling a pitch bearing from a wind turbine hub,
    wherein the pitch bearing is bolted to a hub and to a wind turbine blade, the method comprising:
    placing a tool having a socket wrench on a portion of the wind turbine blade, the tool encircling the wind turbine blade and rotatable relative to the wind turbine blade, the socket wrench fixed in location on the tool and rotatable relative to the tool;
    rotating the tool relative to the wind turbine blade to position the socket wrench to engage a nut of the bolted connection between the hub and the pitch bearing;
    removing the nut by rotating the socket wrench relative to the tool;
    repeating positioning the socket wrench by rotating the tool to engage and remove the remaining nuts of the bolted connection between the hub and the pitch bearing; and
    disassembling the pitch bearing from the hub.

2. The method of claim 1, wherein the method further comprises rotating the hub to a position wherein the blade connected to the pitch bearing to be disassembled is in a 3 o'clock position.

3. The method of claim 1, wherein the method further comprises lowering the pitch bearing.

4. The method of claim 3, wherein lowering the pitch bearing comprises lowering a blade at least partially connected to the pitch bearing.

5. The method of claim 4, wherein the method further comprises disconnecting the pitch bearing from the blade on a ground level after lowering the blade at least partially connected to the pitch bearing.

6. The method of claim 5, wherein the disconnecting the pitch bearing from the blade comprises unscrewing the nuts securing the bolts that connect the pitch bearing to the blade before removing the pitch bearing from the hub.

7. The method of claim 5, further comprising:
    repairing or replacing the pitch bearing;
    at least partially connecting the repaired or replaced pitch bearing to the blade forming a repaired blade assembly;
    lifting the repaired blade assembly; and
    assembling the repaired blade assembly with the hub.

8. The method of claim 7, wherein the method comprises subsequently positioning the wind turbine hub such that a next blade assembly to be disassembled from the wind turbine hub is in a 3 o'clock position.

9. The method of claim 5, comprising positioning the wind turbine blade in a substantially horizontal position and holding the wind turbine blade in the substantially horizontal position with a crane while the blade assembly is removed from the hub, and subsequently lowering the blade assembly with the crane.

* * * * *